Figure 1A:
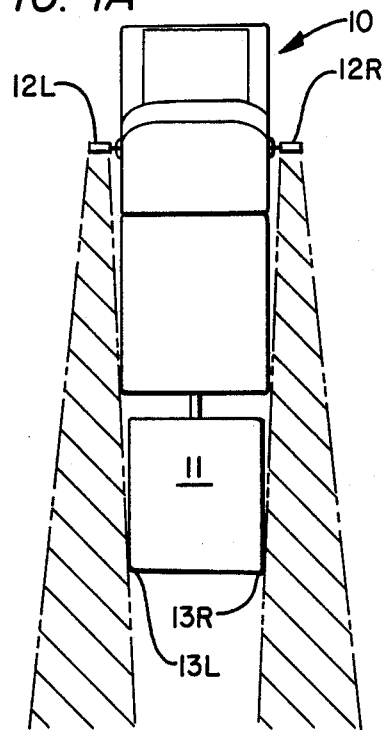

United States Patent [19]

Taylor

[11] Patent Number: 4,905,954
[45] Date of Patent: Mar. 6, 1990

[54] VEHICLE EXTERIOR SIDE MIRROR MOUNT EXTENSION

[76] Inventor: Barry W. Taylor, 818 N. Yale, Garland, Tex. 75042

[21] Appl. No.: 180,069

[22] Filed: Apr. 11, 1988

[51] Int. Cl.$^4$ ............................................. A47F 7/14
[52] U.S. Cl. .................................. 248/475.1; 403/167; D12/187
[58] Field of Search ...................... 248/475.1, 466, 916, 248/300, 219.4; 403/167, 168; D12/187

[56] References Cited

U.S. PATENT DOCUMENTS

| | | | |
|---|---|---|---|
| 1,897,091 | 2/1933 | Weinland | 248/916 |
| 3,068,969 | 12/1962 | Van Kerschaver | 248/475.1 X |
| 3,173,219 | 3/1965 | Yarder | 248/475.1 |
| 3,329,767 | 7/1967 | Lindsey et al. | 248/219.4 X |
| 3,473,773 | 10/1969 | Meyer | 248/475.1 X |
| 3,734,438 | 5/1973 | Kautz | 248/219.4 X |
| 4,562,982 | 1/1986 | McSherry et al. | 248/916 |

FOREIGN PATENT DOCUMENTS 2011330 7/1979 United Kingdom ............. 248/475.1

OTHER PUBLICATIONS

Trailer Life, Jan. 1988, pp. 92, 93, 124, 126 and 129.

Primary Examiner—David L. Talbott
Attorney, Agent, or Firm—Warren H. Kintzinger

[57] ABSTRACT

A vehicle outside rear view mirror mounting extender that is interposed between a vehicle left hand and/or right hand side door mirror mounting and a mirror mount base. The mirror mounting extender has an inboard mounting plate that is mounted to the door mirror mounting assembly and outboard mirror assembly mounting plate with the plates joined by upper and lower parallel spacing struts. With the wider mirror spacing attained with this outside rear view mirror mounting extender rearward vision is greatly improved particularly for trucks without an interior rear view mirror. This external mirror mounting extender presents minimal wind resistance with its open clean structure that provides strong solid support for the mirror.

2 Claims, 2 Drawing Sheets

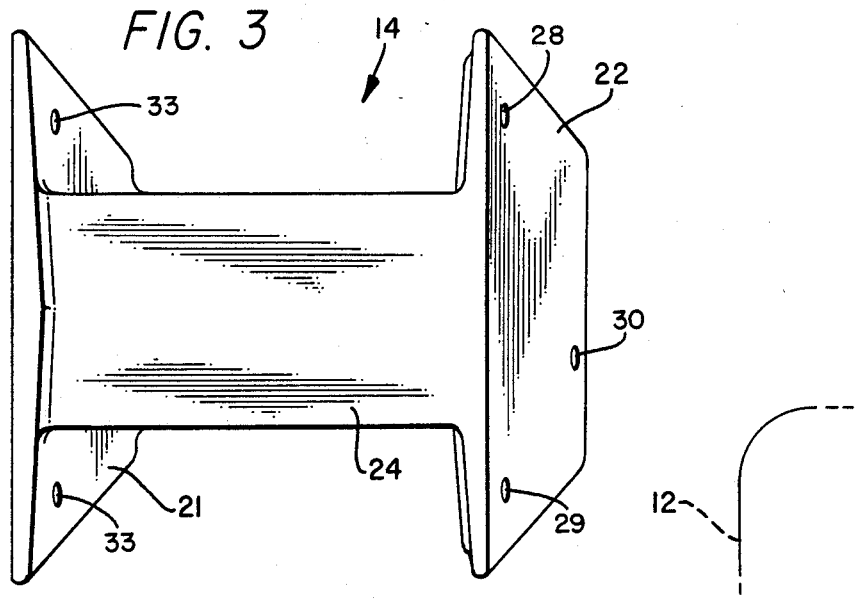
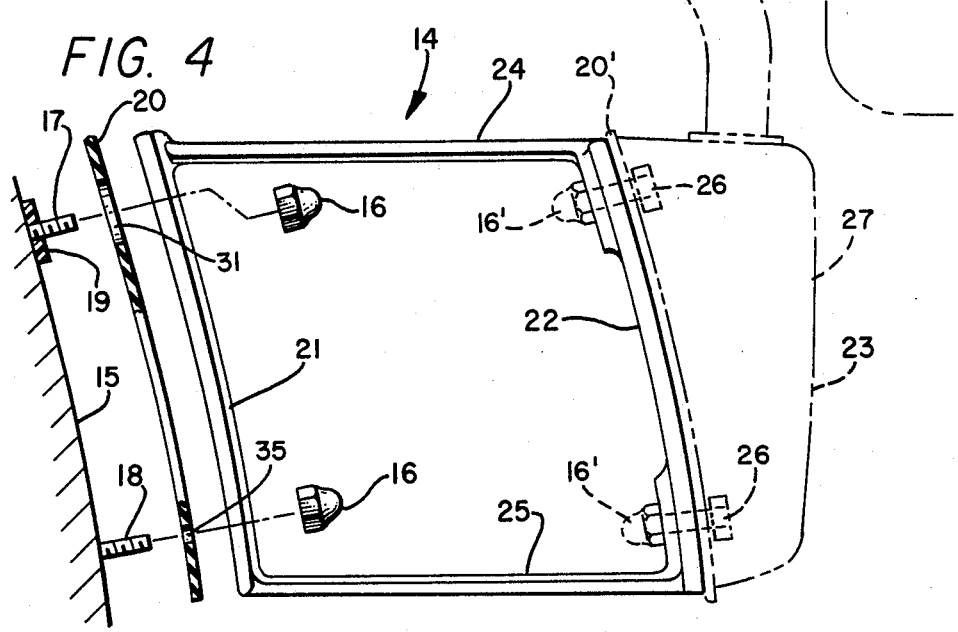

VEHICLE EXTERIOR SIDE MIRROR MOUNT EXTENSION

This invention relates in general to truck door rear view mirror mounting, and more particularly, to a mirror mounting extender having an inner mounting plate mounting on either a right or left truck door and an outer mirror mounting base plate interconnected to the inner mounting plate with upper and lower struts to mount a mirror on a truck door with further extension to the side without any modification of the door mirror mounting structure and of the mirror mounting base.

Outside door mounted rear view mirrors are very important for trucks (and automobiles) pulling trailers. It is so important that most states have enacted laws requiring that special mirrors and/or extended mountings be used for mirrors when towing. In at least one state the tow vehicle mirrors must protrude enough from the vehicle to allow visibility 200 feet to the rear spanning the transverse width of the trailer at that distance and more to the side on both sides on line of sight around the trailer being towed. This enables the trailerist to change lanes without encroaching on the path of an approaching vehicle or colliding with a vehicle travelling in the next lane. Generally the state laws do not specify how or where the mirrors are to be mounted as long as the field-of-view requirements are met. It is also important that outside rear view mirrors be so mounted that they can withstand constant road vibration and still present a clear reflected image since a constantly vibrating mirror is worthless at best if not additionally dangerous. Wind resistance is also a consideration so an outside rear view mirror mounting should be as aerodynamically clean as possible and aesthetically pleasing as well.

It is therefore a principal object of this invention to provide a sturdy outside rear view mirror mount extender for vehicles towing trailers.

Another object is to provide an outside rear view mirror mounting system for vehicles pulling trailers meeting the laws thereon of the various states and other governing bodies.

A further object is to enhance safety in the driving of a trailer pulling vehicle.

Still another object is to provide such an outside rear view mirror mounting extender that is strong and sturdy and so mounted as to minimize if not eliminate mirror vibration.

Another object is to provide such an outside rear view mirror mounting that presents minimal air resistance both aerodynamically and aesthetically pleasing.

Features of the invention useful in accomplishing the above objects include in a vehicle exterior side mirror mount extension, an outside rear view mounting extender that is interposed between a vehicle left hand and/or right hand side door mirror mounting and a mirror mount base. The mirror mounting extender has an inboard mounting plate that is mounted to the door mirror mounting assembly and outboard mirror assembly mounting plate with the plates joined by upper and lower parallel spacing struts. With wider mirror spacing attained with this outside rear view mirror mounting extender rearward vision is greatly improved particularly for trucks without an internal rearview mirror. This external mirror mounting extender presents minimal wind resistance with its open clean structure that provides strong solid support for the mirror.

A specific embodiment representing what is presently regarded as the best mode of carrying out the invention is illustrated in the accompanying drawings.

Figure 1B:
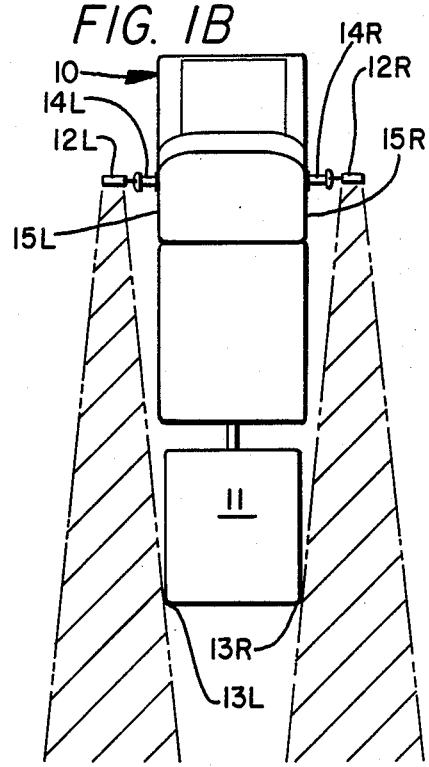
Figure 2:
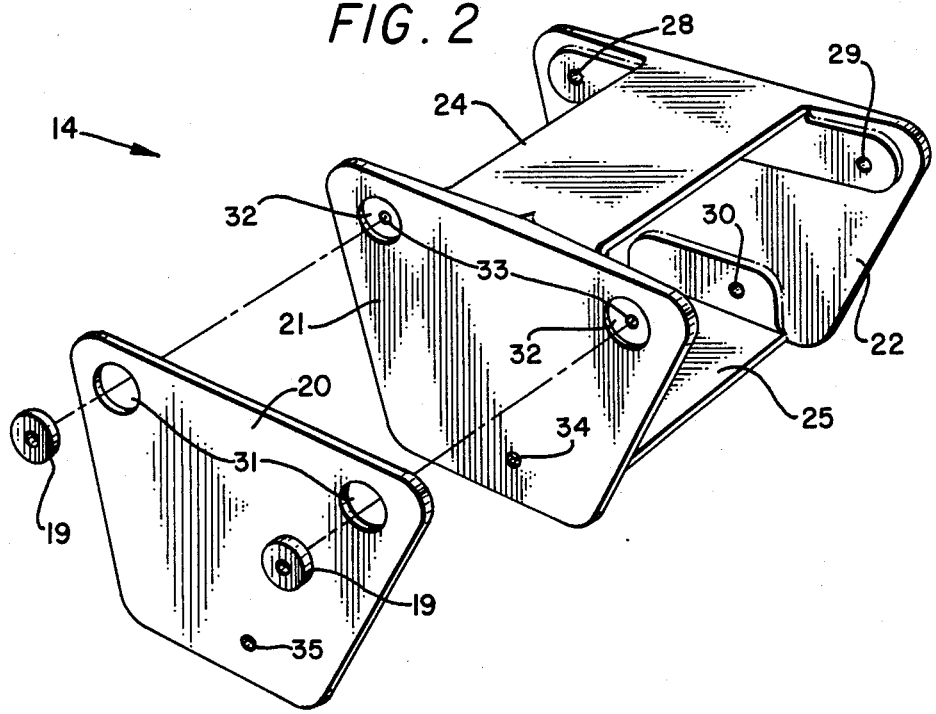

In the drawings:

FIG. 1A represents a top plan view of a truck towing a trailer with a showing of prior art exterior side mirror mountings on opposite sides of the truck and extended fields of view from the mirrors;

FIG. 1B, a top plan view of a truck towing a trailer like the showing of FIG. 1A with, however, exterior side mirror mount extenders being used and a showing of the improved field of view from the mirrors mounted further to the sides;

FIG. 2, a perspective view of a side view mirror mounting extender with an inboard mounting gasket exploded away for showing more detail;

FIG. 3, another perspective view of the side view mirror mounting extender of FIG. 2 showing detail of the extender from an outboard angle; and, FIG. 4, a rear elevation view of the side view mirror mounting extender of FIGS. 2 and 3 exploded from its mounting on a vehicle right side door and the resiliently compressible mounting gasket that fits between the vehicle door and the extender.

Referring to the drawings:

The truck 10 towing a trailer 11 in FIG. 1A is shown to have direct mounted prior art side view mirrors 12L and 12R from which the rearwardly extended fields of view do not converge as much as desired in being limited by the rear corners 13L and 13R of trailer 11. The same truck 10 and trailer 11 combination using the same mirrors 12L and 12R but, in this instance, are shown in FIG. 1B, mounted by side view mirror mounting extenders 14L and 14R to be more wide spread to opposite sides from the truck 10 for an improved reflected field of view (in shaded form) from each of the mirrors 12L and 12R from the mirror fields of view (in shaded form) in FIG. 1A.

Referring also to FIGS. 2, 3 and 4 the extenders 14 are shown to be mounted on the outside of left and right hand doors 15L and 15R with nuts 16 tightened on two bolts 17 at the top and a bolt 18 at the bottom. This is with bolts 17 projecting through rubber (or plastic) washers 19 at the top and with the bolts 17 and 18 extending on through a mounting gasket 20 and the extender inboard mounting plate 21 with nuts 16 tightened down to hold the assembly together and the extender on a door 15. The extenders 14 are each formed with, in addition to inboard mounting plate 21, an outboard mounting plate 22 for mounting a mount base 23 for a mirror 12 that without the extender 14 would be directly mounted to a door 15 with nuts 16 tightening the mount base 23 in place with bolts 17 and 18. The inboard mounting plate 21 and the outboard mounting plate 22 of each extender 14 are joined by upper and lower spaced parallel spacing struts 24 and 25. With this construction the extender 14 is a strong sturdy open structure yet aerodynamically clean. An additional mounting gasket 20' much like, if not the same as, mounting gasket 20 is provided with mirror mount base 23 to provide vibration resistant cushioning between the mount base 23 and outboard mounting plate 22 when nuts 16' are tightened on bolts 26 to fasten the mount base 23 on outboard mounting plate 22. The mirror mounting base 23 includes an outer removeable cover 27 removal of which facilitates mounting of the base 23 on the outboard mounting plate 22 with tightening of the units 16' and bolts 26 that extend through openings in the mounting base 23 and the gasket 20' and through openings 28, 29 and 30 in the outboard mounting plate 22. It should also be noted that the mounting gasket 20 has enlarged openings 31 that accomodate nylon washers 19 that extend into counter sunk openings 32 in extender inboard mounting plate 21 when nuts 16 are tightened down on the two bolts 17 and the bolt 18 for mounting of the side view mirror mounting extender 14 on a truck door 15. The bolts 17 extend through openings 33 in inboard mounting plate 21 and bolt 18 extends through opening 34 in mounting plate 21 and through opening 35 in gasket 20.

Whereas this invention has been described primarily with respect to a single embodiment thereof, it should be realized that various changes may be made without departure from the essential contributions to the art made by the teachings hereof.

I claim:

1. A vehicle outside rear view mirror and mounting extender assembly comprising: a vehicle side mounted rear view mirror mounting unitary extender having an inboard mounting plate mountable on vehicle outside rear view mirror mounting means; an outboard mounting plate for mounting of an outside rear view mirror assembly; upper and lower parallel spacing streamlined struts joining said inboard mounting plate and said outboard mounting plate to mount said outside rear view mirror assembly further out to the side from a vehicle for improved vision to the rear for the driver of the vehicle and to the rear of a trailer towed by the vehicle when a trailer is being towed; wherein said upper spacing streamlined strut interconnects the tops of said inboard mounting plate and said outboard mounting plate; said lower spacing streamlined strut interconnects the bottoms of said inboard mounting plate and said outboard mounting plate; with said rear view mirror mounting unitary extender being a through opening unitary structure presenting minimal wind resistance in an extender structure providing strong solid support for the mirror; said mirror mounting unitary extender is mounted to mirror mounting structure on the vehicle side having threaded bolt shanks extending from the side of the vehicle that otherwise is a mounting structure for direct mounting of a mirror assembly; first vibration dampening means is mountable between said inboard mounting plate and said mirror mounting structure on the vehicle; wherein a second vibration dampening means is mountable between said outboard mounting plate and a mounting base of said outside rear view mirror assembly; said first vibration dampening means is a first flexible resiliently compressible gasket; and wherein said second vibration dampening means is a second flexible resiliently compressible gasket, wherein stiff material washers are mounted on said threaded bolt shanks extending from the side of the vehicle; openings are provided through said first flexible resiliently compressible gasket to accommodate said stiff material washers and said inboard mounting plate is provided with countersunk openings into which said stiff material washers project when said extender is mounted to the side of a vehicle.

2. The vehicle outside rear view mirror mounting extender of claim 1, wherein said stiff material washers are nylon.

* * * * *